(12) United States Patent
Bevelhimer et al.

(10) Patent No.: US 11,986,983 B2
(45) Date of Patent: May 21, 2024

(54) BALLISTIC GEL FISH MODEL WITH IMPACT SENSING

(71) Applicant: UT-Battelle, LLC, Oak Ridge, TN (US)

(72) Inventors: Mark S. Bevelhimer, Oak Ridge, TN (US); Ryan Saylor, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 386 days.

(21) Appl. No.: 17/391,142

(22) Filed: Aug. 2, 2021

(65) Prior Publication Data

US 2022/0040894 A1 Feb. 10, 2022

Related U.S. Application Data

(60) Provisional application No. 63/060,966, filed on Aug. 4, 2020.

(51) Int. Cl.
*B29C 45/14* (2006.01)
*B29C 33/38* (2006.01)
*B29L 31/40* (2006.01)
*B33Y 80/00* (2015.01)
*G01N 3/30* (2006.01)
*G01P 15/00* (2006.01)

(52) U.S. Cl.
CPC .......... *B29C 45/14* (2013.01); *B29C 33/3842* (2013.01); *B33Y 80/00* (2014.12); *G01N 3/30* (2013.01); *G01P 15/00* (2013.01); *B29K 2089/00* (2013.01); *B29L 2031/40* (2013.01)

(58) Field of Classification Search
None
See application file for complete search history.

(56) References Cited

U.S. PATENT DOCUMENTS

| 5,077,930 A | 1/1992 | Berry | |
|---|---|---|---|
| 10,067,112 B2 | 9/2018 | Deng et al. | |
| 11,662,710 B2 * | 5/2023 | Cammack | H04N 13/20 700/98 |

(Continued)

OTHER PUBLICATIONS

"Evolution of the Sensor Fish Device for Measuring Physical Conditions in Severe Hydraulic Environments"—Pacific Northwest National Laboratory; Carlson et al., Feb. 2003, PNNL-15708; pp. 1-44 (Year: 2003).*

(Continued)

*Primary Examiner* — Ryan D Walsh
(74) *Attorney, Agent, or Firm* — WARNER NORCROSS + JUDD LLP

(57) ABSTRACT

A fish model to replace the use of live fish in hydroelectric studies is provided. The fish model is cast from ballistic gel to include the density, dimensions, and weight distribution of a selected species of living fish. The fish model is formed by additively manufacturing a mold based on a three-dimensional scan of an actual fish. The mold is then used to mass produce fish models for force measurement testing at various blade speeds, thickness, and impact angles. Each fish model includes a surrogate skin and an internal sensor for strike force measurements. Optional additional sensors include strain gauges, temperature probes, pressure probes, and load sensors, for example.

11 Claims, 7 Drawing Sheets

(56) References Cited

U.S. PATENT DOCUMENTS

| | | | | |
|---|---|---|---|---|
| 2010/0311025 | A1* | 12/2010 | Everett | C08L 89/04 |
| | | | | 106/156.51 |
| 2012/0174659 | A1* | 7/2012 | Johnson | G01N 3/48 |
| | | | | 73/84 |
| 2014/0211594 | A1* | 7/2014 | Allen | H04B 11/00 |
| | | | | 367/139 |
| 2021/0393193 | A1* | 12/2021 | Yoon | A61B 5/053 |

OTHER PUBLICATIONS

"Commercialization of Sensor Fish Technology to Support Hydropower Development (TCF)"—U.S. Department of Energy; Daniel Deng, Ph. D; Oct. 10, 2019; pp. 1-15 (Year: 2019).*

"Synthetic fish measures wild ride through dams"—PNNL News & Media Relations; Nov. 4, 2014; "https://www.pnnl.gov/news/release.aspx?id=3168" (Year: 2014).*

International Search Report and Written Opinion of the International Searching Authority for PCT/US2021/044117 dated Nov. 9, 2021, 8 pages.

Post et al., "Fish Story: Researchers Use 3D Printing, Sensors to Create Models for Hydropower Testing", found at: https://www.oml.gov/news/fish-story-researchers-use-3d-printing-sensors-create-models-hydropower-testing#:~:text=Centers%2C (accessed Dec. 3, 2021).

* cited by examiner

BALLISTIC GEL FISH MODEL WITH IMPACT SENSING

CROSS-REFERENCE TO RELATED APPLICATIONS

This application claims the benefit of U.S. Provisional Application 63/060,966, filed Aug. 4, 2020, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to fish models for hydropower turbine blade strike research and other applications.

BACKGROUND OF THE INVENTION

Injury and mortality of fish during downstream passage through hydropower turbines is one of the primary direct impacts of hydropower on fish. Injuries from turbine blade strikes can be severe and result in mortality. The impacts of turbine blade strikes on fish vary (1) by turbine design and dam operating conditions and (2) by species, fish size, and fish orientation when struck.

Unfortunately, fish are a diverse group of vertebrates that show marked variation in body morphology, which affects risk to turbine passage and blade strikes. Such a tremendous amount of diversity means inferences gained from a few species are not necessarily translatable to all other species. The use of live animals provides valuable data, yet the cost of capture or purchase, laboratory space, and food can be prohibitive.

Other challenges include the ability to successfully find and capture the studies species, which may be comparatively rare, protected by conservation status, or both. In addition, with so many different combinations of strike variables that require testing, including blade speed, blade thickness, blade orientation and angle of strike, the number of fish required for testing and the amount of time and effort to conduct the tests becomes formidable. Developing an alternative to using live fish would allow the testing of many more species and combinations of strike variables.

SUMMARY OF THE INVENTION

A fish model to replace the use of live fish in hydroelectric studies is provided. The fish model is cast from ballistic gel to include the density, dimensions, and weight distribution of a selected species of living fish. The fish model is formed by additively manufacturing a mold based on a three-dimensional scan of an actual fish. The mold is then used to mass produce fish models for force measurement testing at various blade speeds, thickness, and impact angles. Each fish model includes a surrogate skin and an internal sensor for strike force measurements. Optional additional sensors include strain gauges, temperature probes, pressure probes, and load sensors, for example.

In one embodiment, a method for manufacturing a fish model is provided. The method includes performing a surface scan of a fish specimen to create a three-dimensional point cloud of a fish model. The method then includes additively manufacturing a mold using the three-dimensional point cloud, the mold defining a cavity. The method then includes positioning an impact sensor within the mold cavity and injecting a ballistic gelatin into the mold cavity. Once the ballistic gelatin is allowed to cure, the method includes removing the fish model from the mold cavity, the impact sensor being encapsulated within the ballistic gelatin body of the fish model. The method optionally includes applying a surrogate skin to the exterior of the fish model, the surrogate skin being one or more layers of a thermoplastic resin to replicate the fish specimen.

In another embodiment, a fish model for strike force measurement is provided. The fish model includes at least one impact sensor encapsulated within a fish-shaped body of ballistic gelatin. The fish model further includes a synthetic skin comprising at least one thermoplastic coating on the ballistic gelatin. The at least one impact sensor is optionally a plurality of accelerometers that extend along a filament in a lengthwise direction of the fish model, between an anterior region and a posterior region of the fish model. Optional additional sensors within the fish-shaped ballistic gelatin body include strain gauges, temperature probes, pressure probes, and load sensors.

As set forth herein, the ballistic gel fish model can be easily and inexpensively created to replicate essentially any species and size of fish and would allow researchers to conduct virtually unlimited strike measurement scenarios in an experimental setting. Because the additively manufactured mold is reusable, the cost per fish model goes down with each successive fish model that is cast. In addition, a ballistic gel fish model of the correct dimensions, density, and weight distribution can more accurately respond to a blade strike in a manner that can inform the probably of injury and mortality from a wide variety of hydroelectric turbine blade impacts without harm to live fish.

These and other features of the invention will be more fully understood and appreciated by reference to the description of the embodiments and the drawings.

DETAILED DESCRIPTION OF THE CURRENT EMBODIMENTS

Figure 1:
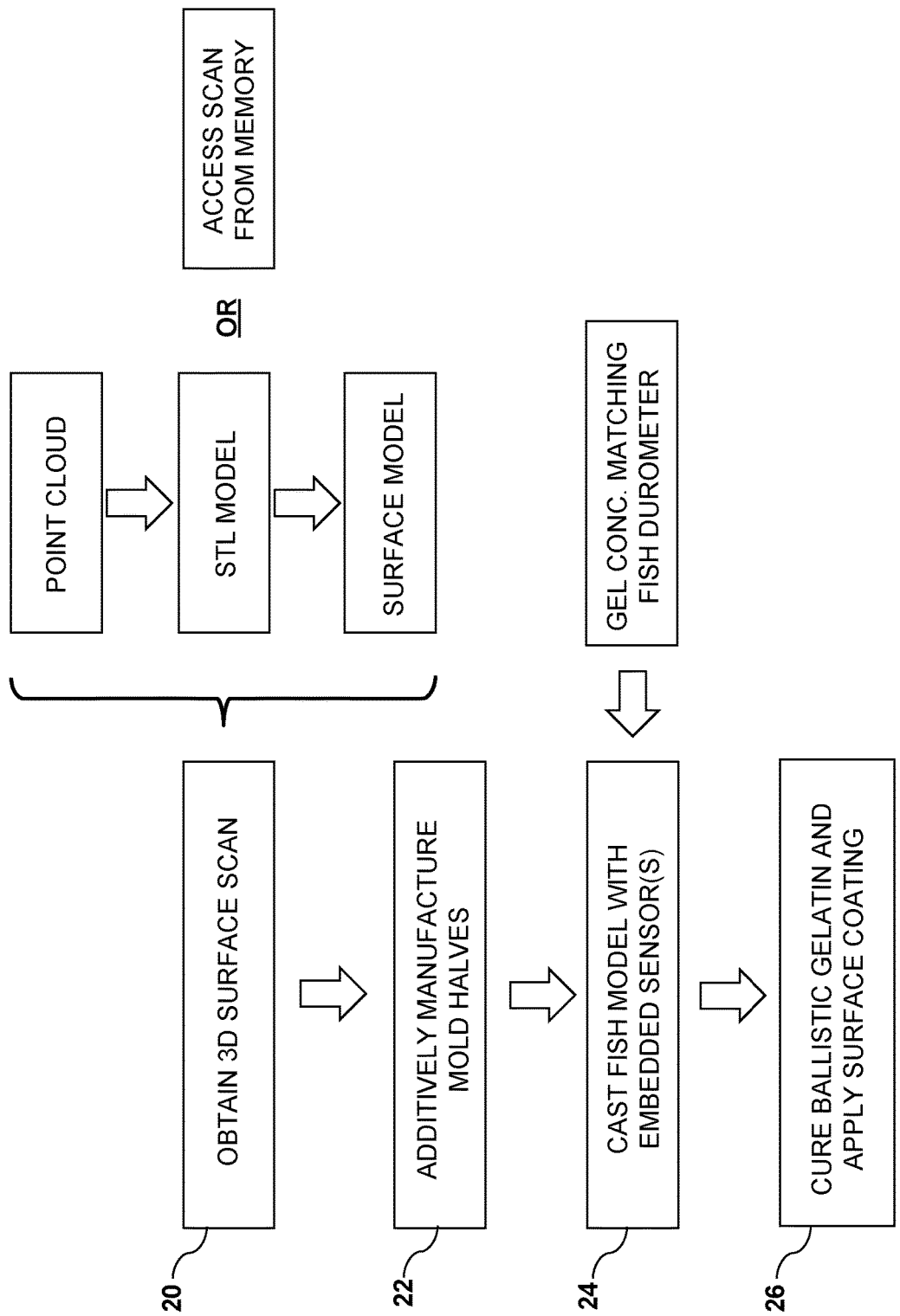
FIG. 1 is a flow chart illustrating a method of manufacturing a ballistic gel fish model.

As discussed herein, the current embodiments include a method of manufacturing a fish model for hydroelectric studies. As shown in FIG. 1, the method generally includes: (a) obtaining a 3D data model that is based on a surface scan of a fish specimen, (b) additively manufacturing a mold using the 3D data model, the mold defining a mold cavity, (c) positioning at least one impact sensor within the mold cavity and injecting a ballistic gelatin into the mold cavity, and (d) removing the fish model from the mold cavity after the ballistic gelatin has cured, the at least one impact sensor being encapsulated within the fish model for strike force measurement. Each such operation is separately discussed below.

Obtaining a 3D data model is depicted as step 20 in FIG. 1 and generally includes performing a surface scan of a fish specimen or accessing a surface scan from memory. For example, this method step can include performing a surface scan of a fish specimen using a 3D scanner. Optional 3D scanners include the Leica Laser Tracker by Hexagon AB and the ScanArm by FARO Technologies, Inc. The resultant digital object model can include a point cloud or polygonal mesh. The digital object model can optionally include sub-parts, for example sub-parts corresponding to different sub-components of the fish specimen. The 3D data model can also be accessed from an online database or other file repository. The 3D data model is then converted into a CAD file format for development into a mold having a mold cavity in the shape of the fish specimen. The resultant CAD file can then be converted into a file format that is supported by a 3D printer, optionally the .STL format.

Figure 2:
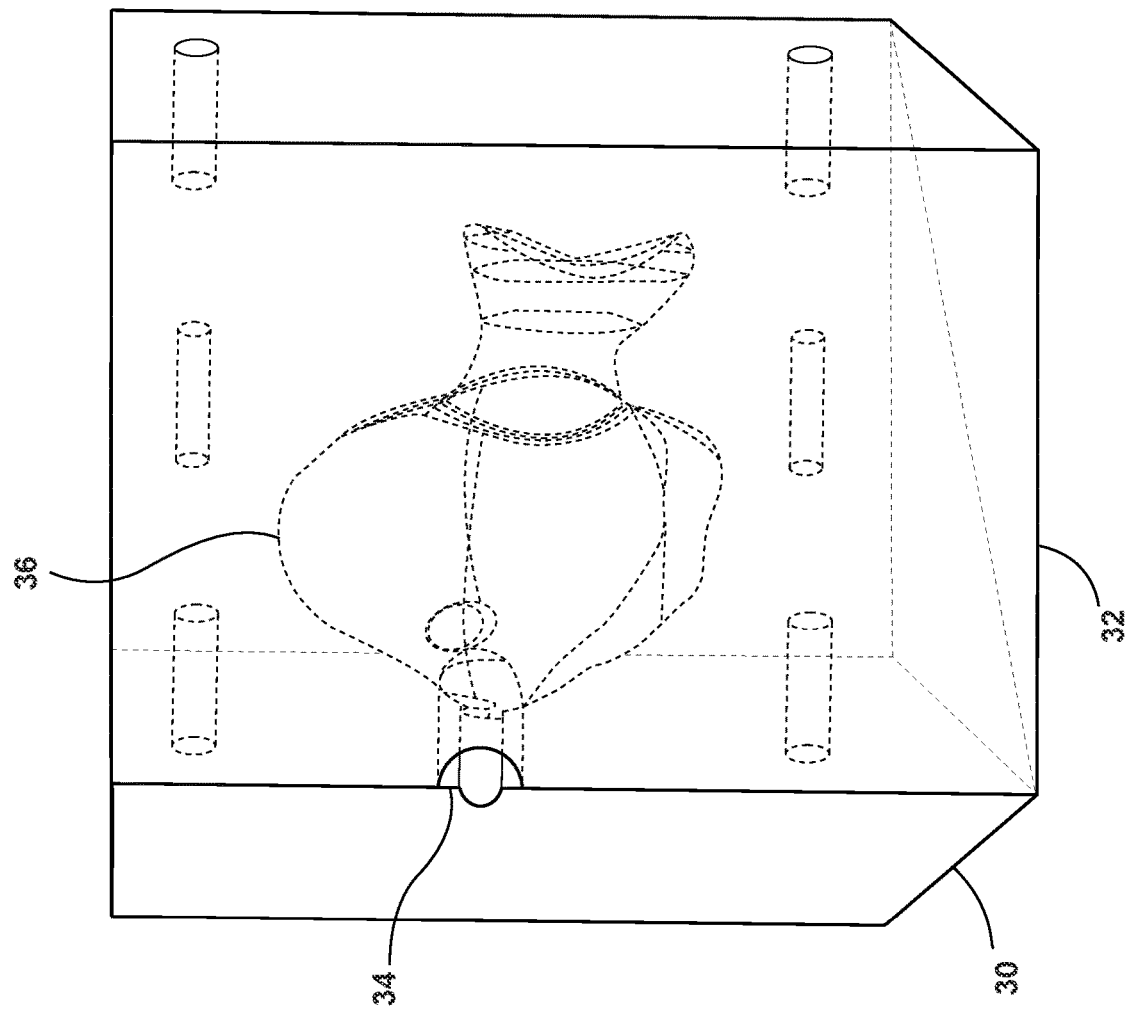
FIG. 2 illustrates an additively manufactured mold for a bluegill (*Lepomis macrochirus*) ballistic gel fish model.
Figure 3:
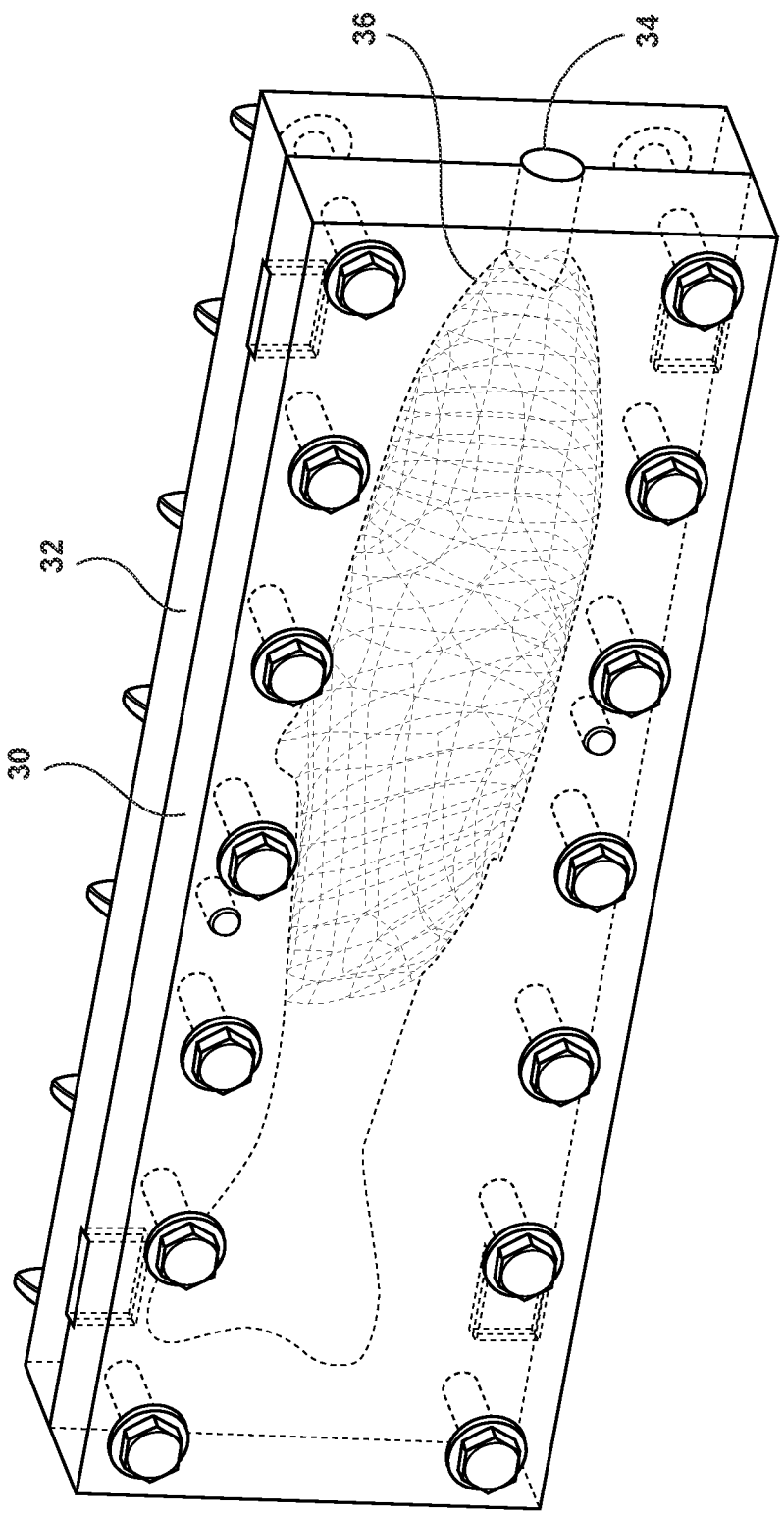
FIG. 3 illustrates an additively manufactured mold for a rainbow trout (*Oncorhynchus mykiss*) ballistic gel fish model.

Additively manufacturing a mold based on the 3D data model is depicted as step 22 in FIG. 1 and generally includes 3D printing first and second mold halves. This method step can include any process that deposits or creates material in successive layers to form a three-dimensional object, not being limited to any specific additive manufacturing process. The mold halves can be formed from any suitable material, including metals, plastics, and ceramics. Optional processes can include binder jet printing and directed metal deposition. An example three-dimensional printer includes the Fortus 400mc by Stratasys Inc. for printing mold halves composed of acrylonitrile butadiene styrene (ABS), however other 3D printers and can be used in other embodiments as desired. The resulting mold halves can be finished by polishing with acetone to completely seal each mold surface prior to casting. Example molds are shown in FIGS. 2-3. In particular, FIG. 2 illustrates an additively manufactured mold for a bluegill (*Lepomis macrochirus*) ballistic gel fish model, and FIG. 3 illustrates an additively manufactured mold for a rainbow trout (*Oncorhynchus mykiss*) ballistic gel fish model, with each mold comprising first and second mold halves 30, 32 that define a mold inlet 34 and a mold cavity 36.

Figure 4:
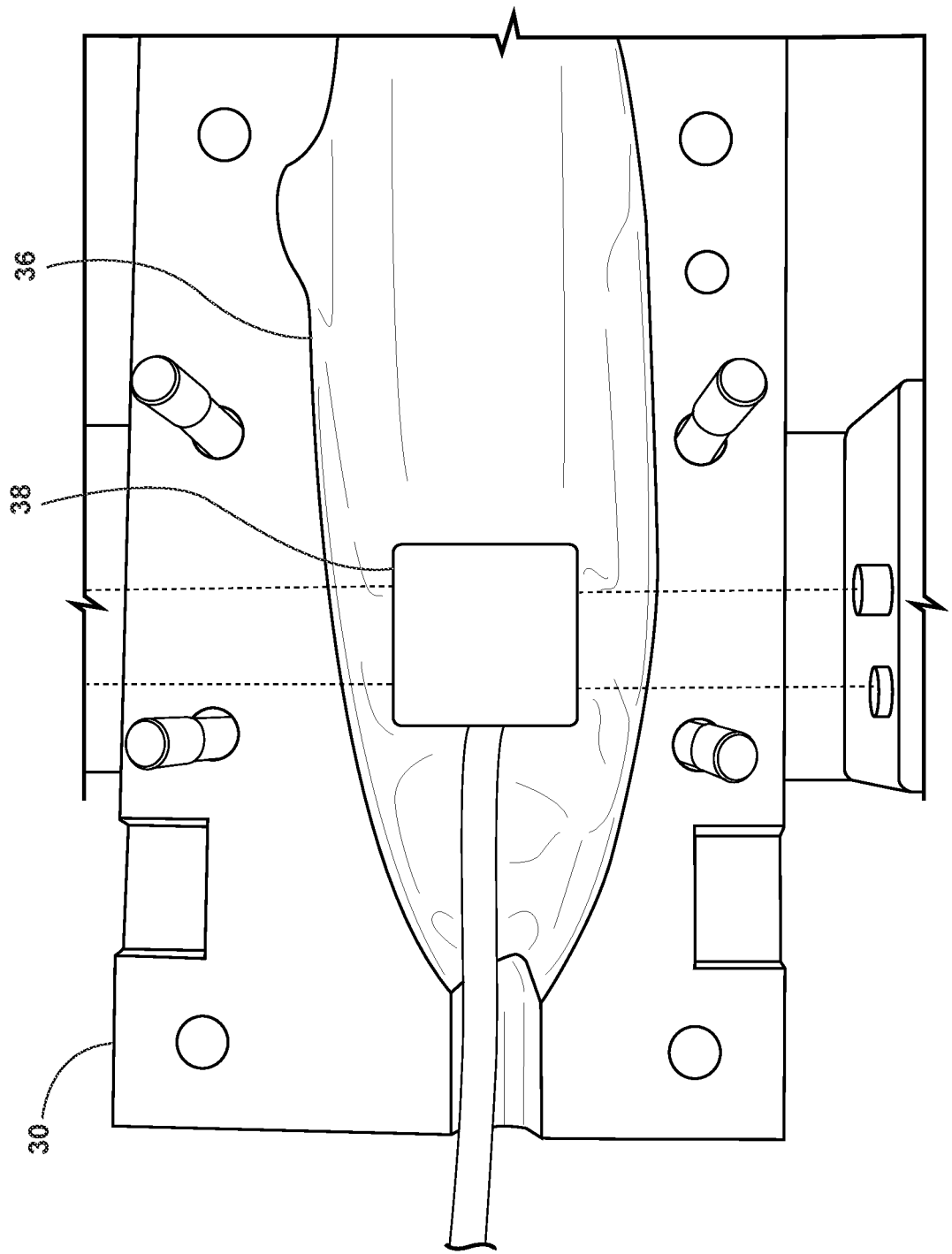
FIG. 4 is an illustration of an accelerometer positioned within a mold half for casting a ballistic gel fish model.

Casting the fish model with an embedded sensor is depicted as step 24 in FIG. 1 and includes the selection of an appropriate sensor(s) and overmolding the sensor(s) with a ballistic gelatin having a density corresponding to that of the fish specimen. As shown in FIG. 4, the sensor(s) can include a single three-axis accelerometer 38. In other embodiments, the sensor(s) can include multiple accelerometers positioned lengthwise along a filament between an anterior region and a posterior region of the fish model. Additional sensors can include a strain gauge, a temperature probe, a pressure probe, and a load sensor. Example ballistic gelatins include Vyse Professional Grade Ballistic Gelatin from Custom Collagen, Inc., of Addison, Illinois, however other ballistic gelatins can be used in other embodiments. The ballistic gelatin is formulated to include the desired durometer (e.g., material hardness or resistance to indentation) corresponding to the fish specimen being modeled. For example, the ballistic gelatin can be formulated to achieve a Shore durometer, once cured, of between 20 and 60.

Figure 5:
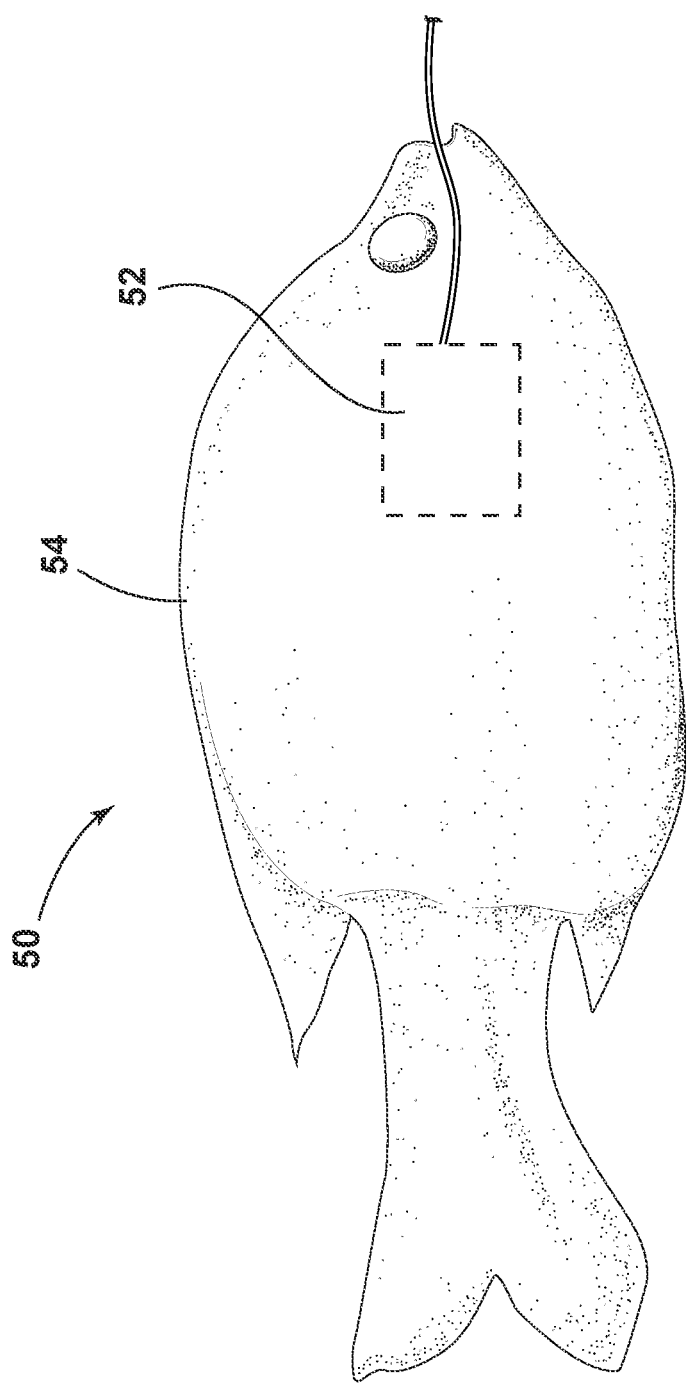
FIG. 5 is an illustration of a first ballistic gel fish model having an embedded sensor.
Figure 6:
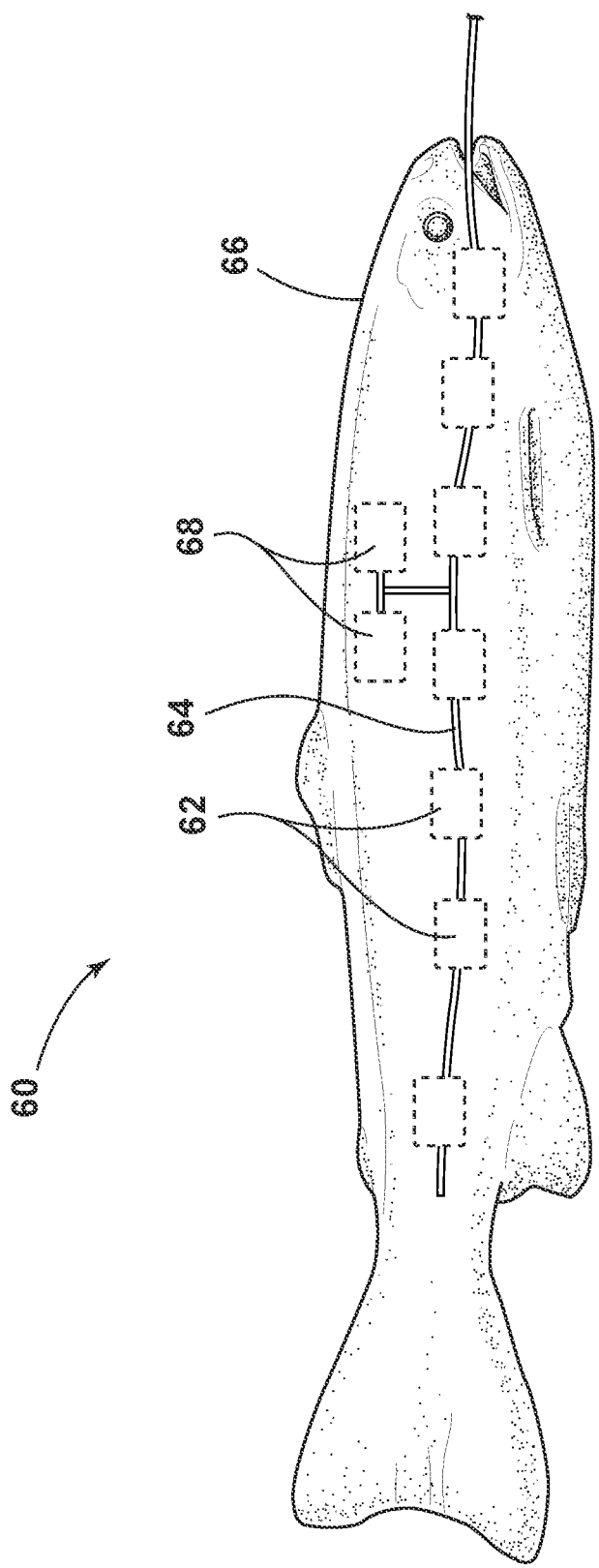
FIG. 6 is an illustration of a second ballistic gel fish model having a plurality of embedded sensors.

Once the ballistic gelatin has cured, the resultant fish model can be removed from the mold and coated with a thermoplastic resin, depicted as step 26 in FIG. 1. Coating the fish model can include dip-coating or spray-coating the thermoplastic resin onto the fish model, the number of layers being selected to achieve the desired durometer to mimic natural tissue. Two fish models manufactured in accordance with the method of the present invention are illustrated in FIGS. 5 and 6, which are intended to be non-limiting. The fish models 50, 60 include at least one least one impact sensor encapsulated within a fish-shaped body of ballistic gelatin. For example, the fish model 50 of FIG. 5 includes a single three-axis accelerometer 52, while the fish model 60 of FIG. 6 includes multiple accelerometers 62 extending along a filament 64 between an anterior region and a posterior region of the fish model. The fish models 50, 60 also include a synthetic skin 54, 66 comprising at least one thermoplastic coating on the ballistic gelatin. As further shown in FIG. 6, the fish model 60 can optionally contain additional sensors 68, for example a strain gauge, temperature probe, pressure probe, or load sensor.

The present invention is further described below in connection with a laboratory example, which is intended to be non-limiting.

Biometric image data was acquired from surface scans of bluegill (*Lepomis macrochirus*), rainbow trout (*Oncorhynchus mykiss*), gizzard shad (*Dorosoma cepedianum*) and white bass (*Morone chrysops*). Two different scanners were used: a Leica Laser Tracker and a FARO ScanArm. Verisurf software (verisurf.com/software) was used to convert scanner images into a point cloud file. The point cloud files were then imported into Geomagic Design X software (3dsystems.com), smoothed, and transformed into a mesh. The final mesh was converted into a SolidWorks surface image using the "auto surface" feature by specifying an organic geometry type, target patch count of 500, and default adaptive tolerance. The SolidWorks surface image was exported as a .STP file to be used in printing the fish mold for each fish specimen.

Each CAD model was reviewed to ensure clean demolding and purging of air during casting. The thickness of the caudal fin and peduncle was increased so that the fish models would not rip when removed from the mold. A fill hole was added to each CAD model on the anterior (head region) through the mouth to avoid disrupting the shape of the body and to allow easy access for filling the mold with ballistic gelatin. The final CAD model was split in half and an extruded box was placed around the fish to allow sufficient room for alignment holes, pry points, and mounting hardware. The molds were printed using a Stratasys Fortus 400mc printing system and were composed of acrylonitrile butadiene styrene (ABS) and sparse fill. The inside of each mold half was polished with acetone to completely seal each surface prior to casting.

A three-axis accelerometer (ADXL375 from Analog Devices, Inc.) with a measurement range of ±200 g was used for strike force measurements. The accelerometer was potted with black epoxy compound (3M-DP270) and held in position within the mold using a monofilament line that stretched from head to tail. The accelerometer was positioned posterior to what would be the operculum of a live fish. This location represents the mid-body and is the most susceptible region to hydropower turbine blade strikes. The mold was then securely closed and kept in an upright position to cast the fish model.

Figure 7:
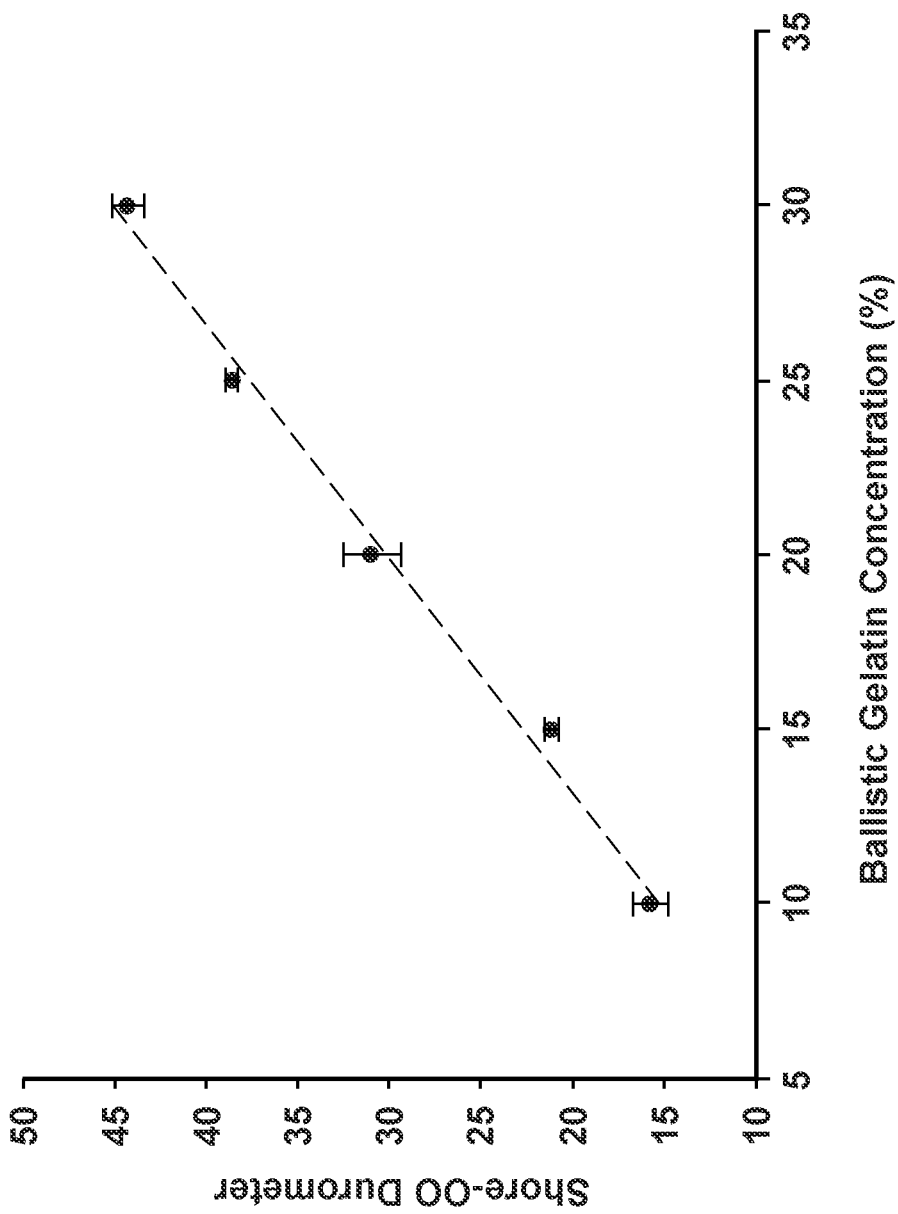
FIG. 7 is a graph of the average Shore-OO durometer versus ballistic gelatin concentration, with the dashed line representing a linear regression model.

A 25% ballistic gelatin solution (Vyse Professional Grade Ballistic Gelatin) was prepared at 45° C. and injected into the mold using a 60 mL syringe with an extended tip. As shown in FIG. 7, the ballistic gelatin concentration was found to have a linear relationship with the durometer of the cast fish model. The extended tip was inserted completely into the mold and gelatin of the desired concentration was injected from the bottom upwards to avoid the formation of bubbles. After the mold cavity was filled, the ballistic gelatin was allowed to cool for 10 minutes and was refrigerated at 4° C. for at least 90 minutes. Refrigeration was used to accelerate cooling and decrease the time required for the gelatin to completely set. Following refrigeration, the ballistic gelatin model was removed from the mold and refrigerated at 4° C. for 12 hours. A surrogate skin (Plasti Dip) was applied in four layers, with at least 45 minutes of curing time between each layer.

In laboratory testing, the ballistic gel fish models withstood multiple blade strike impacts at comparably high velocities (up to 11.5 m/s) without deteriorating. The accelerometer also remained functional throughout testing, and can be reused in subsequent molding operations. Output data from the accelerometer was accessed through an I2C interface, and changes in acceleration were detected in all three axes, including during blade approach, blade impact, and as the model moved away following impact. Peak magnitude generally occurred 10 ms after the bow wave produced by the blade pushed the model prior to impact, with the entire process taking less than 30 ms to complete.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method for manufacturing a fish model, the method comprising:

performing a surface scan of a fish specimen to obtain a digital object model of the fish specimen;

additively manufacturing a mold based on the digital object model of the fish specimen, the mold defining a mold cavity;

joining a plurality of impact sensors to a filament, the plurality of impact sensors being serially spaced apart from each other along the filament;

positioning the filament and the impact sensors within the mold cavity, the filament being disposed in a lengthwise direction within the mold cavity;

injecting a ballistic gelatin into the mold cavity to overcoat the filament and the plurality of impact sensors contained within the mold cavity;

allowing the ballistic gelatin to cure within the mold cavity, thereby resulting in a fish model containing the plurality of impact sensors that are serially spaced apart from each other between an anterior region of the fish model and a posterior region of the fish model; and removing the fish model from the mold cavity after curing of the fish model, the plurality of impact sensors being fully encapsulated within the fish model for strike force measurement at a plurality of interior locations within the fish model.

2. The method of claim 1, wherein each of the plurality of impact sensors comprise an accelerometer.

3. The method of claim 1, further including applying a surrogate skin to an exterior of the fish model after removing the fish model from the mold cavity.

4. The method of claim 3, wherein applying the surrogate skin includes dip-coating or spray-coating a thermoplastic resin onto the fish model.

5. The method of claim 3, wherein applying the surrogate skin includes applying a plurality of layers of a thermoplastic resin onto the fish model.

6. The method of claim 1, wherein the ballistic gelatin, when cured, provides a Shore durometer of between 20 and 60.

7. The method of claim 1, further including positioning at least one of a strain gauge, temperature probe, pressure probe, and load sensor within the mold cavity for encapsulation within the fish model.

8. A fish model for strike force measurement, the fish model comprising:

a plurality of impact sensors encapsulated within a fish-shaped body of ballistic gelatin, the plurality of impact sensors being joined to a filament that extends in a lengthwise direction between an anterior region and a posterior region of the fish model, the plurality of impact sensors being serially spaced apart from each other such that the plurality of impact sensors provide strike force measurements at a plurality of interior locations of the fish model; and a synthetic skin comprising at least one thermoplastic coating on the ballistic gelatin.

9. The fish model of claim 8, wherein the plurality of impact sensors comprise a plurality of accelerometers.

10. The fish model of claim 8, wherein the thermoplastic coating includes a plurality of layers of a thermoplastic resin on an exterior of the fish-shaped body.

11. The fish model of claim 8, further including at least one of a strain gauge, temperature probe, pressure probe, and load sensor encapsulated within the fish model.

* * * * *

UNITED STATES PATENT AND TRADEMARK OFFICE
CERTIFICATE OF CORRECTION

| | | |
|---|---|---|
| PATENT NO. | : 11,986,983 B2 | Page 1 of 1 |
| APPLICATION NO. | : 17/391142 | |
| DATED | : May 21, 2024 | |
| INVENTOR(S) | : Mark S. Bevelhimer and Ryan Saylor | |

It is certified that error appears in the above-identified patent and that said Letters Patent is hereby corrected as shown below:

On the Title Page

Item (73) Assignee:
"UT-BATTELLE, LLC, Oak Ridge, TN (US)"
Should be:
-- "UT-BATTELLE, LLC, Oak Ridge, TN (US) and
UNIVERSITY OF TENNESSEE RESEARCH FOUNDATION, Knoxville, TN (US) --

Signed and Sealed this
Fifth Day of August, 2025

Coke Morgan Stewart
*Acting Director of the United States Patent and Trademark Office*